US008862638B2

(12) United States Patent
Williamson (10) Patent No.: US 8,862,638 B2
(45) Date of Patent: Oct. 14, 2014

(54) INTERPOLATION DATA TEMPLATE TO NORMALIZE ANALYTIC RUNS

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 445 days.

(21) Appl. No.: 13/037,332

(22) Filed: Feb. 28, 2011

(65) Prior Publication Data

US 2012/0221503 A1    Aug. 30, 2012

(51) Int. Cl.
 *G06F 7/00* (2006.01)
 *G06N 5/02* (2006.01)

(52) U.S. Cl.
 USPC ............................................ 707/810; 706/47

(58) Field of Classification Search
 USPC ............... 707/802–804, 807, 809, 810, 791; 706/13, 47
 See application file for complete search history.

(56) References Cited

U.S. PATENT DOCUMENTS

| | | | |
|---|---|---|---|
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,704,758 B1 * | 3/2004 | O'Donnell | 708/290 |
| 6,711,597 B1 * | 3/2004 | O'Donnell | 708/290 |
| 6,735,590 B1 | 5/2004 | Shoup et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,408,155 B2 * | 8/2008 | Oosaki et al. | 250/310 |
| 7,660,822 B1 | 2/2010 | Pfleger | |
| 8,346,817 B2 | 1/2013 | Williamson | |
| 8,364,687 B2 | 1/2013 | Williamson | |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0083034 A1 | 6/2002 | Orbanes et al. | |

(Continued)

OTHER PUBLICATIONS

Using OLAP and Multi-Dimensional data for decision making, Hasan et al. IEEE 2001.

(Continued)

*Primary Examiner* — Hung T Vy
(74) *Attorney, Agent, or Firm* — Lowenstein Sandler LLP (57) ABSTRACT

Embodiments relate to systems and methods for generating an interpolation data template to normalize analytic runs. A database can store sets of operational data, such as financial, medical, climate or other information. For given data, a portion of the input data can be known or predetermined, while for a second portion can be unknown and subject to interpolation. The interpolation engine can generate a conformal interpolation function and interpolated input sets that map to a set of target output data. In aspects, an interpolation history database can stores results of a variety of interpolation studies or results, from which a set of interpolation templates can be derived. The templates can reflect trends or patterns discovered or displayed in the historical interpolation results, for instance, to produce expected values for different variables based on averages, thresholds, or other criteria applied to the historical results. New interpolation studies can apply data-selected templates chosen to match their operative data, and produce normalized data as the interpolation results themselves, or provide a starting point for further interpolation processing.

22 Claims, 7 Drawing Sheets

(56) References Cited

U.S. PATENT DOCUMENTS

| | | |
|---|---|---|
| 2002/0087516 A1 | 7/2002 | Cras et al. |
| 2002/0169658 A1 | 11/2002 | Adler |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0060382 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0033185 A1* | 2/2007 | Maag ............... 707/6 |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2009/0278792 A1* | 11/2009 | Toebes et al. ............ 345/156 |
| 2010/0057700 A1 | 3/2010 | Williamson |
| 2010/0057777 A1 | 3/2010 | Williamson |
| 2010/0131456 A1 | 5/2010 | Williamson |
| 2010/0149917 A1* | 6/2010 | Imhof et al. ............... 367/53 |
| 2010/0169299 A1 | 7/2010 | Pollara |
| 2010/0174532 A1* | 7/2010 | Vos et al. ................. 704/205 |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2010/0329229 A1* | 12/2010 | Lipka et al. .............. 370/344 |
| 2011/0050728 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0064854 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |
| 2012/0221585 A1 | 8/2012 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network USing Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Validating Interpolation Results Using Monte Carlo Simulations on Interpolated Data Inputs", U.S. Appl. No. 13/037,344, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

ASPFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases. Pourabbas et al, LNCS 2737, pp. 24-34, 2003.

USPTO Notice of Allowance and Fees Due for U.S. Appl. No. 13/037,341 mailed May 15, 2012.

USPTO Notice of Allowance and Fees Due for U.S. Appl. No. 13/037,341 mailed Feb. 19, 2014.

\* cited by examiner

INTERPOLATION DATA TEMPLATE TO NORMALIZE ANALYTIC RUNS

FIELD

The invention relates generally to systems and methods for generating an interpolation data template to normalize analytic runs, and more particularly, to platforms and techniques for constructing or extracting a set of interpolation templates from an interpolation history database, applying one or more of those templates to the subject data of a new interpolation analysis, process or run to produce normalize or estimated interpolation values without a need to initially perform full analytic processing runs.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, or precisely controlled and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or interpolation run or analysis may not be known, while, at the same time, a desired or target output may be known or estimated with some accuracy. For instance, the budget for the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

In cases where an interpolation run is conducted, the ultimate selection of interpolated inputs and other data used to perform the interpolation may itself contain implied information regarding the appropriate breakdowns of the data, judgments about which inputs should receive priority compared to others, and other attributes of the eventual input breakouts and the interpolation function developed for that data. In cases, the values or user seeded data, both precise and non-precise for the interpolated inputs may be introduced by an analyst or other user acting to adjust those interpolated values, to determine different feasible alternative solutions.

In cases, it would aid the efficiency of the interpolation process if an initial set of interpolated input results could be generated directly from the raw set of operative data to be used in a new or updated interpolation feasibility analysis. Thus, for instance, a user performing a analysis on a set of medical data related to epidemiology may wish to interpolate desirable inoculation rates, doses, age cohorts, and/or other data related to an infectious season for the influenza virus for the current year. To begin that analysis, the user would, without the aid of other tools or services, have to apply an interpolation approach, including processing one, some, or all of potentially very large-scale medical data, to arrive at a first set of interpolated results to consider for their analysis or report. In cases where the operative data consists of very large-scale data, such as terabytes, petabytes, exabytes, and/or other amounts of data, that initial processing could represent a significant load on servers or other processor resources, requiring possibly hours or days of delay to complete. It may be desirable to provide systems and methods for generating an interpolation data template to normalize analytic runs, in which a set of selectable interpolation templates can be accessed to discover one or more feasible templates that match or partially match the content, nature, and/or attributes of the data under analysis, to permit an initial set of results to be produced directly from the template, representing normalized or estimated interpolation outcomes derived from studies of similar data sets in the past.

DESCRIPTION

Embodiments relate to systems and methods for generating an interpolation data template to normalize analytic runs. More particularly, embodiments relate to platforms and techniques that can generate and derive a set of interpolation templates that can be used to initially generate and/or normalize a set of interpolation results from a set of operative data under study. In aspects, an interpolation history database can store the constituent data and attributes or metadata from the interpolation process itself as well as the interpolation results from a variety of previously-performed interpolation analyses or reports, such as medical analyses, financial analyses, engineering or technical analyses, and/or other analytic runs using interpolation platforms, services, or techniques. An interpolation engine can be configured to access and scrutinize and/or mine that data to discover or locate data sets having a similar size, dimension, format, content, attributes, and/or other characteristics, for instance based on a matching or similarity of constituent data and the corresponding interpolation classifications. The interpolation engine can then apply a set of extraction rules to construct an interpolation template for data that is grouped in the same class or category, or with the same patterns or implied information, meaning values which reflect for instance a normalized, average or default value for individual variables in the expected interpolation results. When new analyses are initiated, the user can access the set of interpolation templates, have a matching template identified or select a template themselves, and apply that template to the current operative data to generate an initial set of results that correspond to an implied data function and formulas to the normalized, average, best-available, and/or optimized values or results derived from the output patterns of the collected historical runs. In aspects, the template-derived results can be calculated or generated without performing complete initial interpolation processing, or any initial interpolation processing, thus providing a gain in computational efficiency. That initial set of template-derived data can then be used to perform further interpolation processing, and/or can be accepted as satisfactory interpolation results.

In terms of the interpolated data which the weighting module, tool, or logic can access and operated on, that underlying data can be generated by one or more underlying interpolation platforms which access or retrieve a set of historical, operational, archival, or other operative data related to captured technical, financial, medical, or other operations, and supply that operative data as well as seeded data by the user to an interpolation engine. The interpolation engine can also be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for the interpolation platform can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data.

In cases, an analyst, operator, and/or other user may wish to generate and explore variations, modifications, and/or alternatives to the historical input data and/or the interpolated portions of that data, or possibly of the output data. In such scenarios, a user can invoke a weighting or ranking tool hosted in the interpolation engine, in order to a weighting dialog to input user-selected or specified weights to apply to one or more of the set of predetermined data, and/or interpolated input data or other data. The user can pursue different scenarios using different sets of weights that they have entered, to compare different outcomes or series of input and output data. In an economic report or analysis by a bank investigating the effects of interest rates on housing sales, and thus mortgages, for example, a user may assign a weight of 1.1 (i.e., increase the value or significance by 10%) to the prevailing interest rate for a certain category of housing over the first quarter of 2009, while inputting or assigning a weight of 0.9 (i.e., decrease the value or significance) to the amount of housing stock available in the same quarter. The user can then view the results of that adjustment on the predetermined output data to examine whether that output remains at its initial or desired value, and/or to see the effects on the set of interpolated input data, such as for instance average time on market for a housing unit, due to that altered scenario. From there the bank can interpolation this result again its branch operations in order to determine mortgage-issuance targets for these branches. Other variations or combinations of data weightings of course are possible.

In cases, the interpolation engine, weighting tool, and/or other logic can generate different combinations of the set of interpolated input data in different generations, series, and/or other alternative values or groupings, to permit an analyst or other user to manipulate the input values, to observe different ramifications of different weights that may be applied to parts of, and/or time periods for, the set of interpolated inputs and/or other components of the data. The user of the weighting tool can be presented with a weighting dialog or other interface to manipulate the weights, scales, and/or other modifiers to be applied to the set of interpolated input values, and select or adjust those values (and/or the interpolation function used to generate those values). The analyst or other user can thereby determine scenarios, sets of weights to be applied to the known inputs or other types of data, and examine the effects on the output data, to determine for instance whether the known output data can be maintained or maintained within desired ranges under different weighting conditions. The ability to analyze and derive input sets under different weights, time periods for those weights, and/or other selective adjustments may permit an operator to explore or derive new series of input data that may produce already-known or desired outputs, and/or other outputs if those inputs are varied by relative importance or weight. In aspects, the interpolation function that may accept the weighted input values and still maintain or output the set of known or fixed output data can also be identified or generated.

After completion of those or other types of interpolation studies or reports, according to the present teachings, the sets of weights, the sets of time periods for those weights, the set of resulting interpolated input values and other data can be stored to a local or remote data store. According to embodiments of the present teachings, that data can then be accessed or retrieved by the same interpolation platform and/or weighting tool, and/or other tools or users, for instance to perform further interpolation or modeling activity consistent with the weighted and/or interpolated values and target output data.

Figure 1:
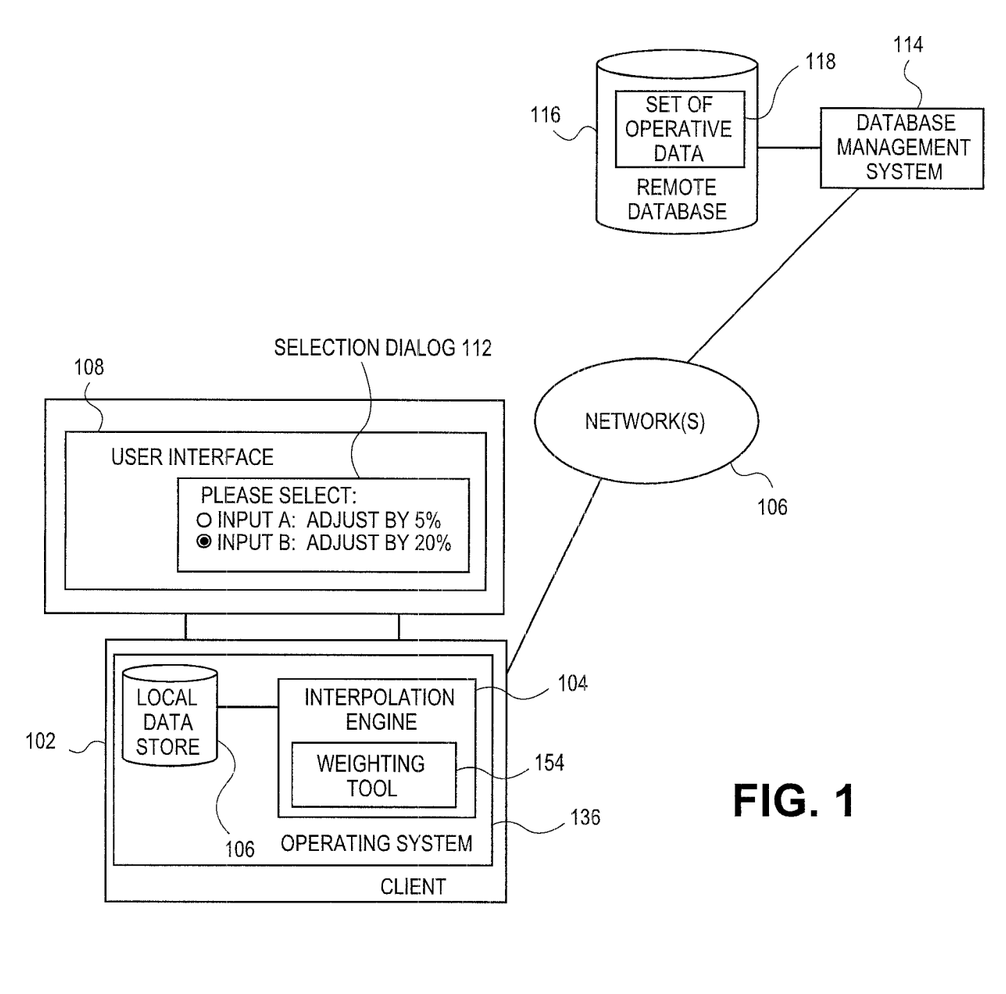
FIG. 1 illustrates an overall network architecture which can support the generation of interpolated input sets based on a target output, according to various embodiments of the present teachings.

Consistent with the foregoing, in embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflecting expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2A:
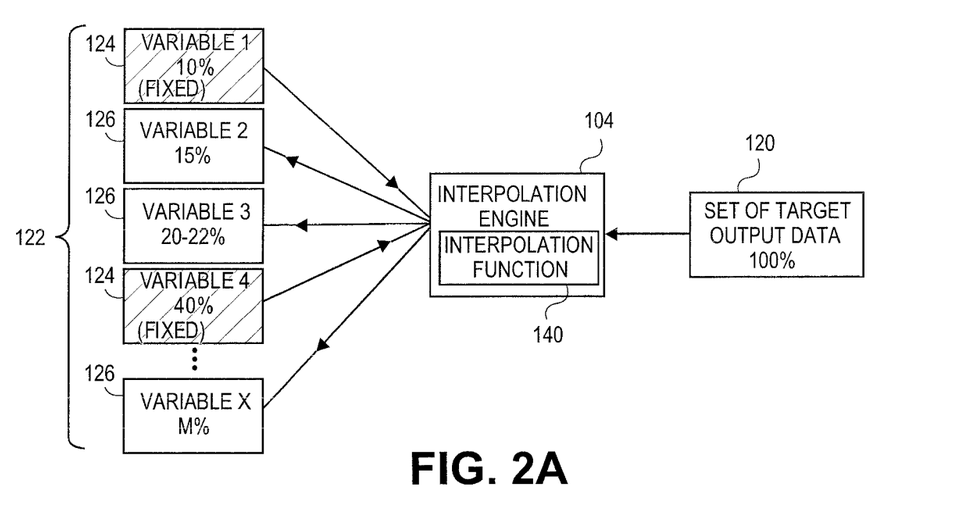
FIGS. 2A-2B illustrate various exemplary sets of input data, and series of sets of input data, that can be produced by interpolation techniques whose output and other data can be used in systems and methods for interpolating alternative input sets based on user weighted variables, according to various embodiments.
Figure 2B:
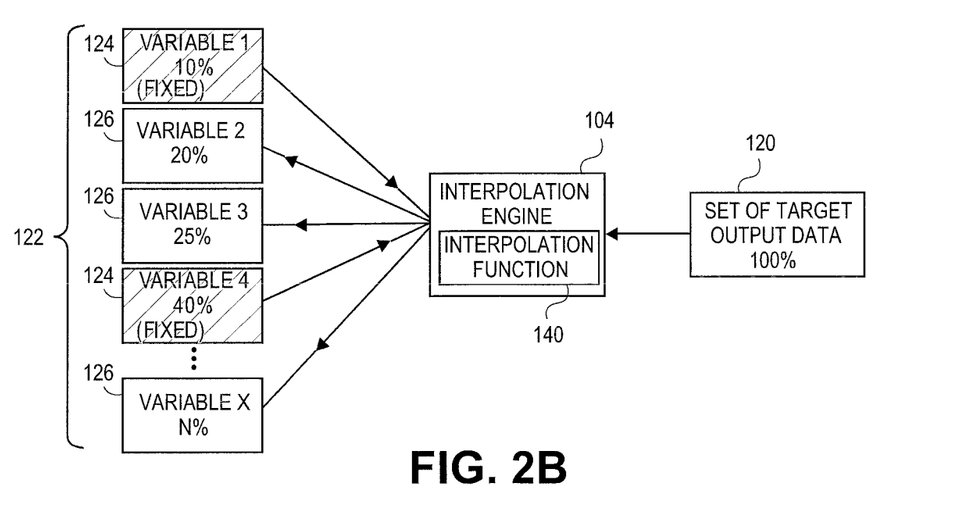

In embodiments, and as shown in FIGS. 2A-2B, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology analysis, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 104. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled "Systems and Methods for Interpolating Conformal Input Sets Based on a Target Output," filed on Aug. 31, 2010, having the same inventor as this application, assigned or under obligation of assignment to the same entity as this application, and incorporated by reference in its entirety herein, can be used in determining interpolation function 140, configuring and/or executing interpolation engine 104, and/or performing other operations. In aspects, the interpolation engine 104 can also comprise, host, and/or access a weighting tool 154, which may be used to open or initiate a weighting dialog and receive user inputs, selections, and/or other manipulations to the set of predetermined input data 124 and/or other data components, to generate different or alternative data series for comparative examination or other purposes, as described herein.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study or analysis. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 related to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted, when the possible conformal set of interpolated inputs 126 is not unique, the interpolation engine 104 can generate a set of interpolated input series, each series containing a set of interpolated input data 126 which is different and contains potentially different interpolated inputs from other conformal data sets in the set of interpolated input series. In cases where such alternatives exist, the interpolation engine 104 can generate and present the set of interpolated input series, for instance, in series-by-series graphical representations or otherwise, to select, compare, and/or manipulate the results and values of those respective data sets. In embodiments, the analyst or other user may be given a selection or opportunity to choose one set of interpolated input data 126 out of the set of interpolated input series for use in their intended application, or can, in embodiments, be presented with options to continue to analyze and interpolate the set of operative data 118, for example to generate new series in the set of interpolated input series 128. Other processing options, stages, and outcome selections are possible.

Figure 3:
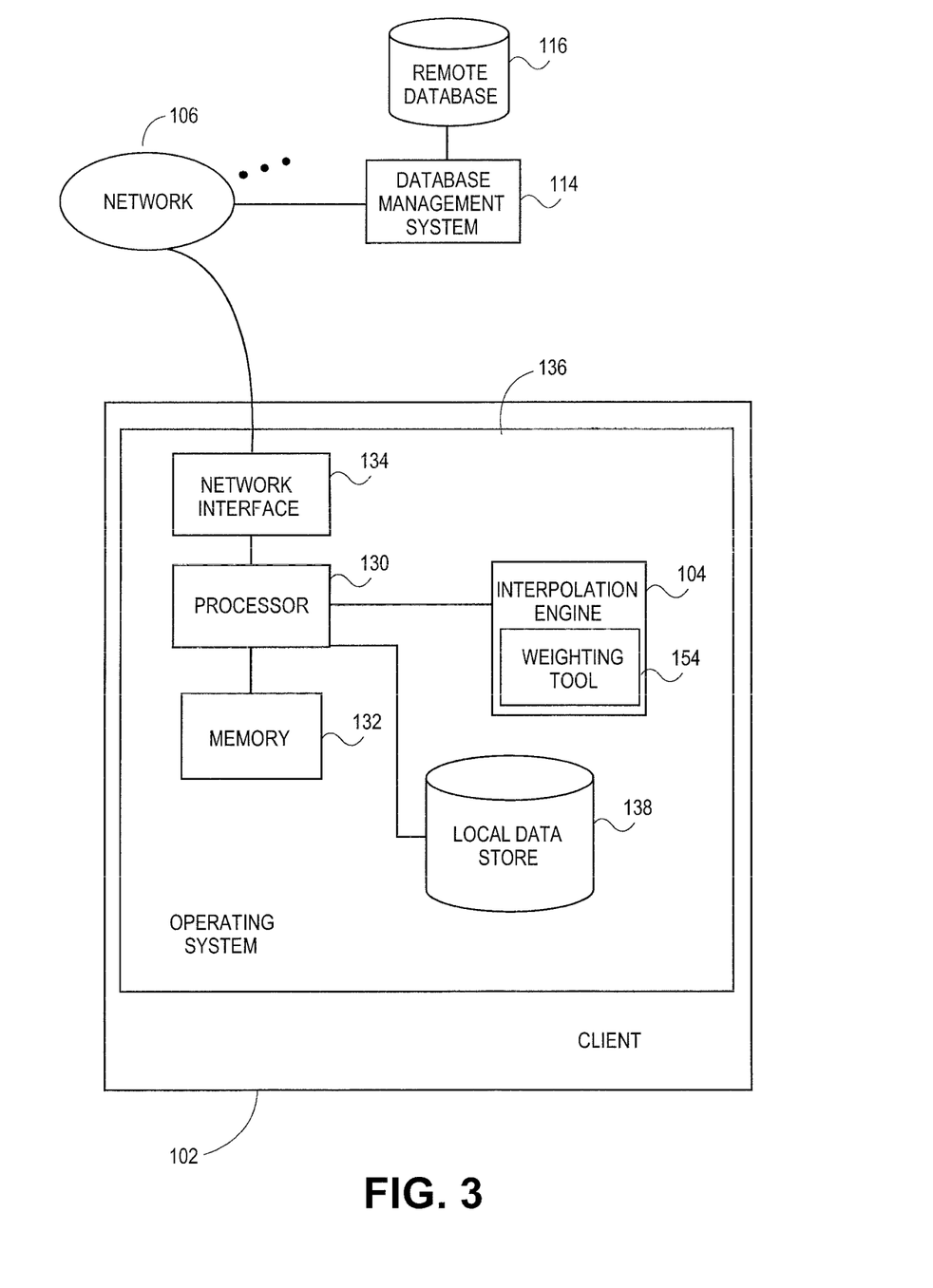
FIG. 3 illustrates an exemplary hardware configuration for s client machine which can host or access interpolation processes whose output and related data can be used in systems and methods for generating interpolation data template to normalize analytic runs, according to various embodiments.

FIG. 3 illustrates an exemplary diagram of hardware and other resources that can be incorporated in a client 102 that can host interpolation engine 104, weighting dialog 148, weighting tool 154, and/or other logic or resources, and/or otherwise be used in connection with systems and methods for interpolating alternative input sets based on user-weighted variables, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114 and/or other platforms can be or include a computer system comprising the same or similar components as the client 102, or can comprise different hardware and software resources.

Figure 4:
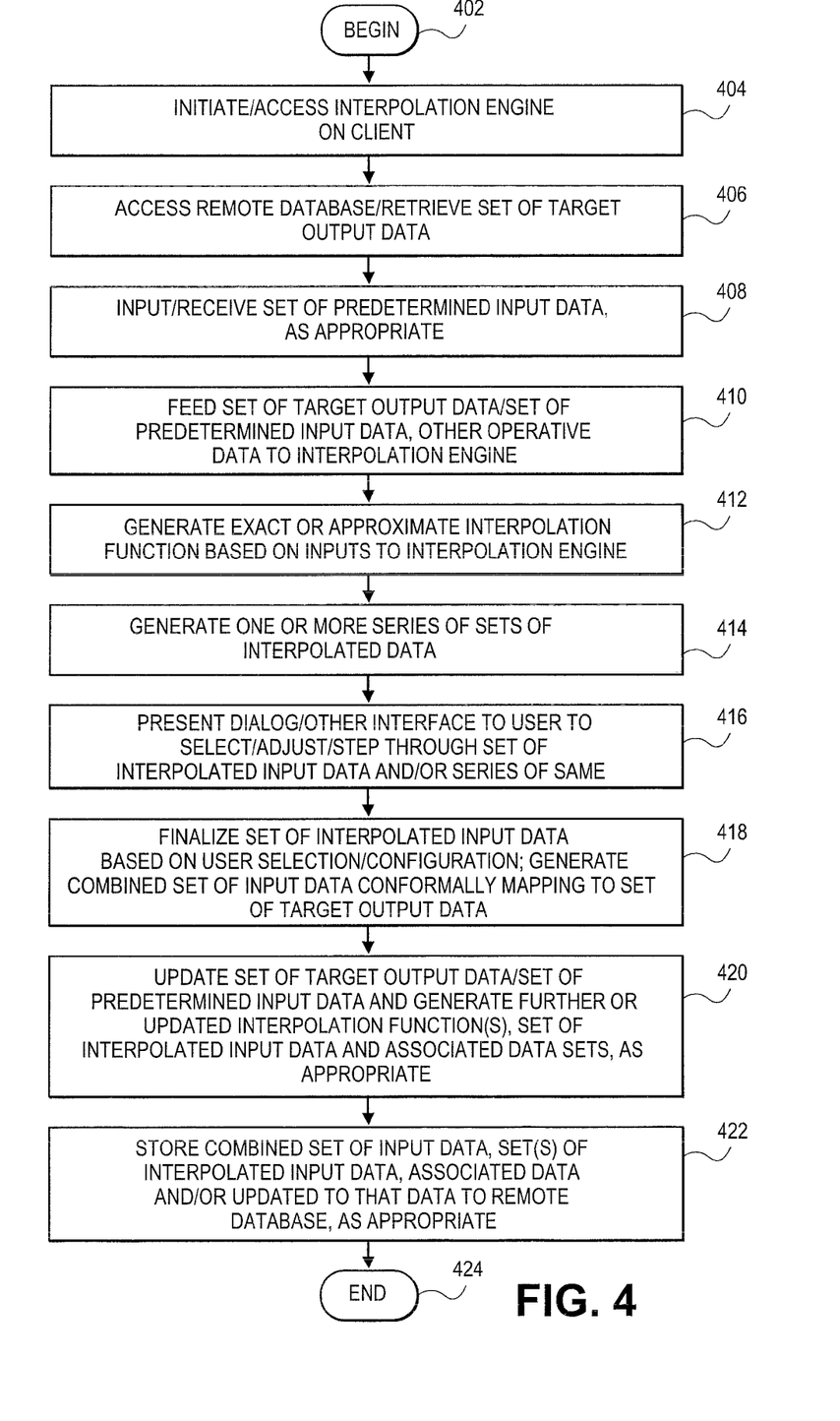
FIG. 4 illustrates a flowchart for overall interpolation, function determination, and other processing that can be used to produce conformal input sets based on a target output that can be used in systems and methods for generating interpolation data template to normalize analytic runs, according to various embodiments.

FIG. 4 illustrates a flowchart of overall processing to generate interpolation functions, sets of interpolated data, and other reports or information, according to various embodiments of the present teachings. In 402, processing can begin. In 404, a user can initiate and/or access the interpolation engine 104 on client 102, and/or through other devices, hardware, or services. In 406, the user can access the remote database 116 via the database management system 114 and retrieve the set of target output data 120 and/or other associated data or information. In 408, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 410, the set of target output data 120, the set of predetermined input data 124, and/or other data in set of operative data 118 or other associated data can be fed to interpolation engine 104.

In 412, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 414, the interpolation engine 104 can generate one or more subsets of interpolated input data 126, and/or one or more set of interpolated input series 128 containing individual different combinations of subsets of interpolated input data 126. In aspects, the set of interpolated input data 126 and/or the set of interpolated input series 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or the set of interpolated input series 128 can be generated by producing sets of possible interpolated inputs which are then presented to the user via the selection dialog 112, for instance to permit the user to accept, decline, or modify the values of set of interpolated input data 126 and/or the set of interpolated input series 128.

In 416, the interpolation engine 104 can present the selection dialog 112 to the user to select, adjust, step through, and/or otherwise manipulate the set of interpolated input data 126 and/or the set of interpolated input series 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or set of interpolated input series 128 through different interface mechanisms, such as slider tools to slide the value of different interpolated inputs through desired ranges. In 418, the user can finalize the set of interpolated input data 126, and the interpolation engine 104 can generate the resulting combined set of input data 122 which conformally maps to the set of target output data 120. In 420, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 422, the combined set of input data 122, the set of interpolated input data 126, the set of interpolated input series 128, the interpolation function 140, and/or associated data or information can be stored to the set of operative data 118 in the remote database 116, and/or to other local or remote storage. In 424, as understood by persons skilled in the art, processing can repeat, return to a prior processing point, jump to a further processing point, or end.

According to embodiments of the present teachings, the interpolation engine 104 and/or other logic or service can be configured to formulate or generate a set of interpolation templates, to apply to new operative data and generate a normalized and/or potentially optimized set of initial outputs, without necessarily conducting full-scale interpolation processing on the raw data. In implementations, the interpolation engine 104 and/or other logic or service can construct and/or access an interpolation history database, to discover or group related or corresponding operative data sets based on their attributes, dimensions, and/or other characteristics. The collective results of interpolation activities on those historical data sets can then be used to build a set of interpolation templates which can encode normalized, and/or optimized, values for interpolated quantities those grouped historical data classes. One or more of the interpolation templates can then be applied to new sets of operative data under current study. The subject data to be analyzed by the interpolation engine can be matched to an appropriate corresponding template, and that template can be used to develop template-derived initial interpolation results for further refinement or direct acceptance of those results.

Figure 5:
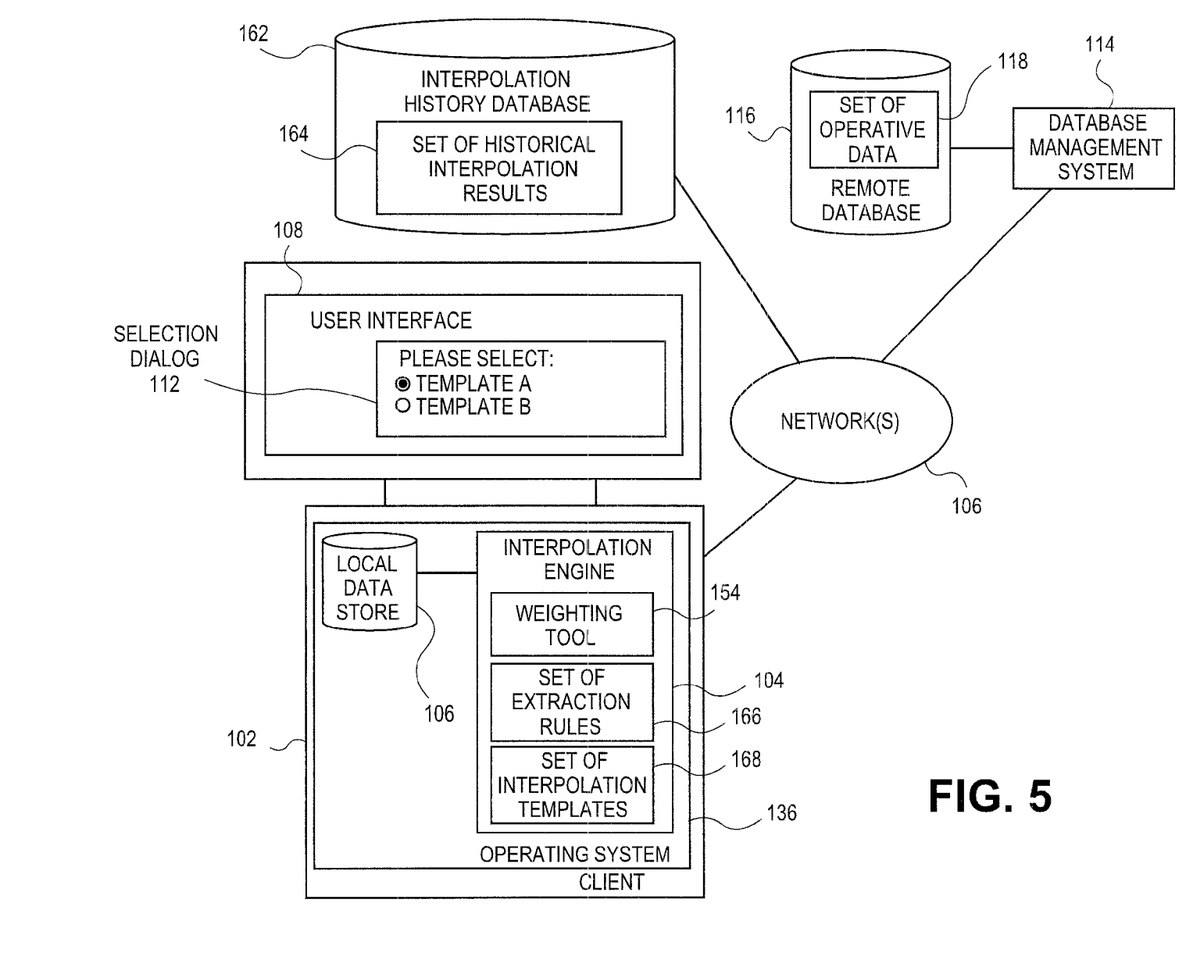
FIG. 5 illustrates an exemplary network configuration that can be used in conjunction with systems and methods for generating interpolation data template to normalize analytic runs, according to various embodiments of the present teachings.

More particularly, and as for shown in FIG. 5, in embodiments, the interpolation engine 104 of client 102 can be configured to access or interact with an interpolation history database 162, which can in turn host a set of historical interpolation results 164. The set of historical interpolation results 164 can represent or encode the aggregated results of interpolation studies, reports, or outputs from one or more users over time, and can reflect the operative data from a variety of sources and/or derived from various content, such as, merely for example, medical data, financial data, engineering or other technical data, and/or data from other contexts or sources. In aspects, the interpolation history database 162 can be stored in various formats, such as an object-oriented database (e.g., XML database), a relational database, data tree, and/or other type of data store.

In aspects, the interpolation engine 104 can access the set of historical interpolation results 164 hosted in the interpolation history database 162, and/or other source, and apply a set of extraction rules 166 to develop or construct a set of interpolation templates 168 for user in interpolation operations. In aspects, the set of extraction rules 166 can encode one or more rules, filters, criteria, weights, logic, scalings, and/or other processing commands or configurations to be used to discover, group, and/or organize the set of historical interpolation results 164 and derive and/or modify the set of interpolation templates 168 from that data. In aspects, the set of extraction rules 166 can, for instance, include rules, instructions, and/or commands that data from historical sets of operative data 118 displaying matching variables, attributes, dimensions, and/or other characteristics should be grouped together for purposes of developing common interpolation templates. In aspects, the set of extraction rules 166 can also or instead include rules, instructions, and/or commands that data from historical sets of operative data 118 displaying variables, attributes, dimensions, and/or other characteristics that overlap or correspond to a specified degree should be grouped together for purposes of developing common interpolation templates. Thus for instance, if the data set of two geological studies related to the exploration of undersea oil demonstrate an overlap or commonality of 80% in terms of data dimensions, the names of variables, the values of variables, and/or other characteristics or attributes related to those two sets of operative data 118, the interpolation engine 104 and/or other logic or service can group or associate those two sets of data for purposes of generating a corresponding interpolation template. The set of extraction rules 166 and/or other logic can likewise specify the values of variables or outputs to be encoded in the associated interpolation template, such as, for instance, a set of interpolated inputs 124 for expected undersea oil pressure for a thousand grid points in a ten-square mile area that is equal to an average of the detected volume of oil in the site in appropriate units, adjusted by a multiplication factor of 1.25 times the measured depth of each grid point. Other rules, filters, functions, heuristics, and/or other processing commands or calculations can be specified in the set of extraction rules 166, both to locate potentially related data sets, and in addition to or instead to apply computations to the sets of operative data 118 themselves to produce the set of interpolation templates 168.

Figure 6:
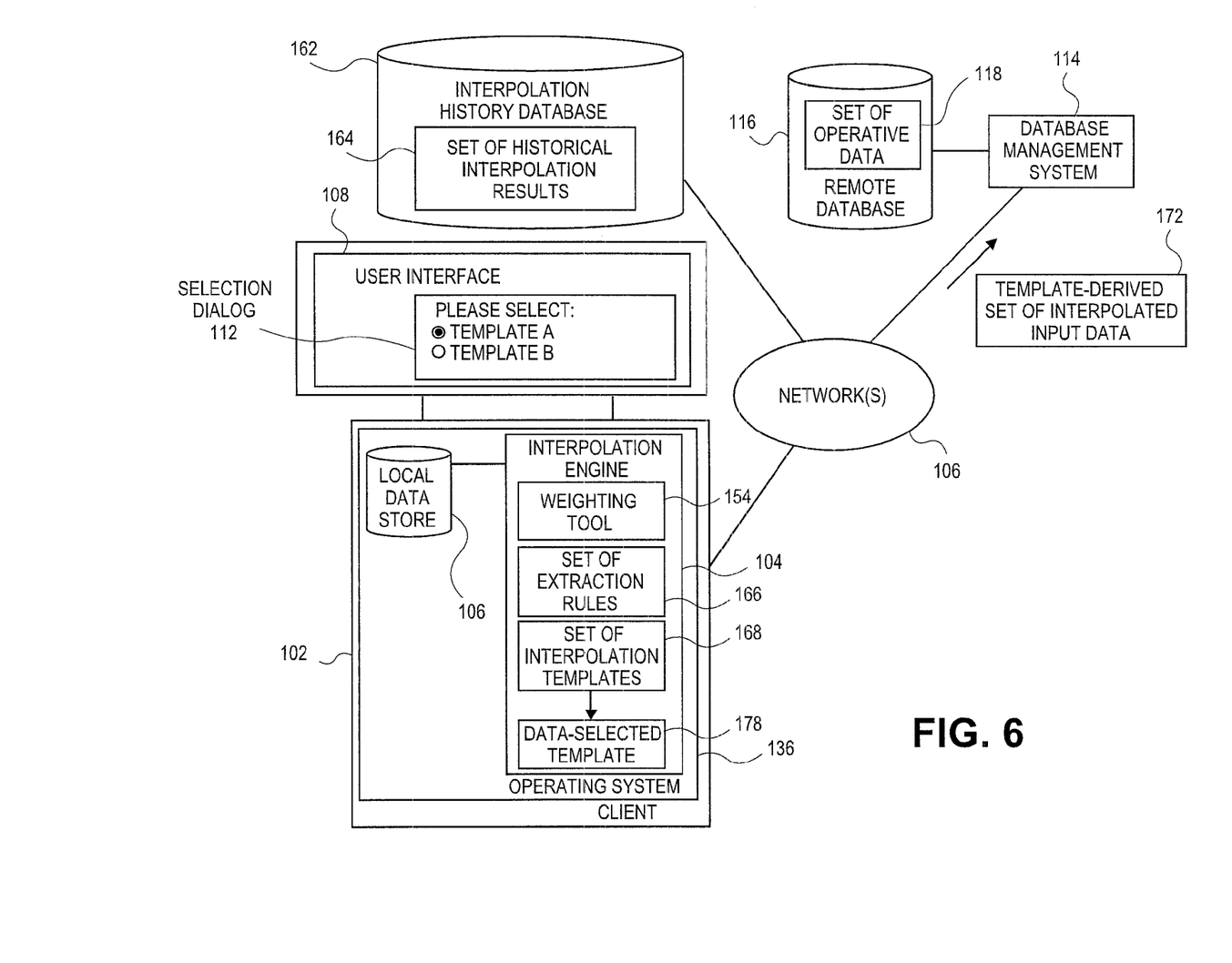
FIG. 6 illustrates an exemplary network that can be used in conjunction with systems and methods for generating interpolation data template to normalize analytic runs, according to further aspects.

After the construction of the set of interpolation templates 168, and as for instance shown generally in FIG. 6, the interpolation engine 104 and/or other logic or service can access a set of operative data 118 for purposes of initiating or continuing an interpolation study, report, and/or related activity. In aspects, the interpolation engine 104 and/or other logic or service can access and/or retrieve the set of operative data 118 to be used for present interpolation activity, and compare that data, for instance its content, format, dimensions, and/or other attributes or characteristics, to the set of interpolation templates 168 to identify a data-selected template 170 corresponding to the class, type, category, and/or other identifier of the set of operative data 118. In aspects, for instance, if a set of operative data 118 related to climate studies is accessed for interpolation processing, a data-selected template 170 can be matched to the content or attributes of that data to select a template labeled "North America Ozone Depletion," to correspond to prior historical interpolation results based on or related to ozone and/or other atmospheric studies. In aspects, the data-selected template 170 can comprise encoding, instructions, filters, and/or other processing scripts to cause the set of interpolated input data 124 derived from the set of operative data 118 to reflect an averaged, normalized, optimized, and/or otherwise rationalized or processed value for carbon dioxide emissions that is scaled to correspond to an ozone depletion rate of, merely for instance, 5% reflected in the set of target output data 120. In aspects, the amount of carbon dioxide emissions necessary to cause or support an ozone depletion rate of 570 might be, again merely for instance, 102.5% of the emissions value from the preceding year, and/or other value, based on the average sensitivity of ozone depletion demonstrated in the set of historical interpolation results 164 to carbon dioxide emissions, and/or rates of change of those emissions. In aspects as shown, that or other results can be encoded in the template-derived set of interpolated input data 172, and/or other results. In aspects, the template-derived set of interpolated input data 172 can be transmitted to the remote database 116 for storage. In aspects, the template-derived set of interpolated input data 172 can in addition or instead be used as the starting point for further interpolation processing, for instance, to generate interpolated output series and/or otherwise refine the template-derived set of interpolated input data 172 to produce a set of interpolated input data 124 that reflects the results or outcome of the interpolation study. Other processing on the template-derived set of interpolated input data 172 and/or other data can take place.

Figure 7:
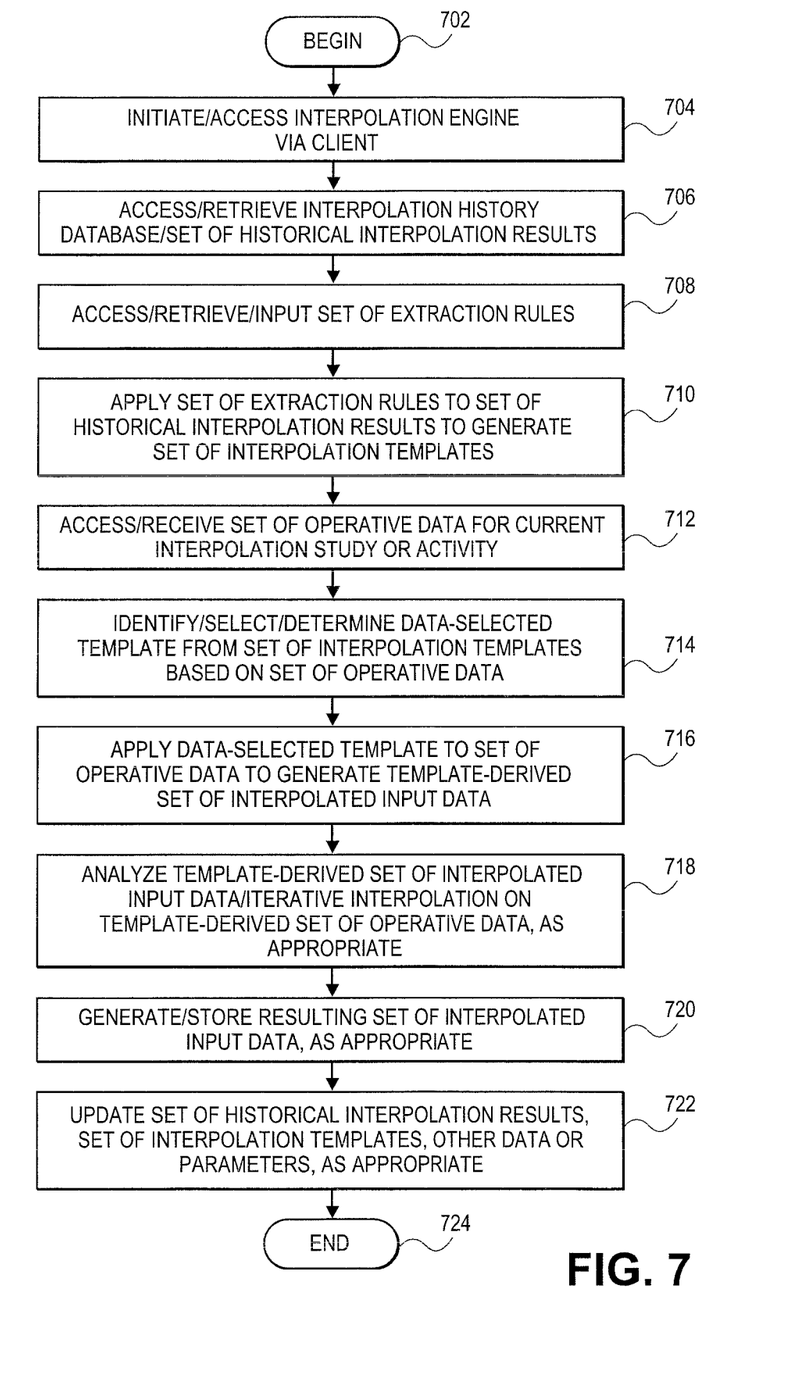
FIG. 7 illustrates a flowchart of exemplary processing that can be used to generate, extract, and apply a set of interpolation templates to subject operative data, in connection with systems and methods for generating interpolation data template to normalize analytic runs, according to various embodiments.

FIG. 7 illustrates an illustration of process flow that can be used in systems and methods for generating interpolation data template to normalize analytic runs, according to various embodiments. In 702, processing can begin. In 704, an analyst, operator, and/or other user can initiate and/or access the interpolation engine 104 on the client 102 and/or other platform, and/or other logic, application, service, and/or interface associated with interpolation activities. In 706, an analyst, operator, and/or other user can access and/or retrieve the interpolation history database 162 and/or the set of historical interpolation results 164 hosted in that database, using interpolation engine 104 and/or other platform, and/or other logic, application, service, and/or interface. In aspects, the set of historical interpolation results 164 can be or include stored and/or aggregated results or outputs, including sets of interpolated inputs and other variables, from a variety of previously conducted interpolation studies, reports, and/or other activities. For instance, the set of historical interpolation results 164 can include a set of interpolation studies and associated input and output data from the financial reports of one company or more than one company, for instance over a span of 10 or 20 years. Other interpolation studies, records, reports, and/or outputs can be stored or encoded in the set of historical interpolation results 164. In 708, an analyst, operator, and/or other user can access and/or retrieve the set of extraction rules 166, which can for example be stored or encoded in the local data store 106 of the client 102, and/or in other local or remote storage. In aspects, the set of extraction rules 166 can be or include a set of logic, criteria, filters, thresholds, weights, and/or other rules, functions, services, and/or other commands or data to be applied to the set of historical interpolation results 164 hosted in interpolation history database 162, and to generate and/or identify one or more existing, updated, and/or new templates to be generated for the set of interpolation templates 168.

In 710, apply the set of extraction rules 166 to the set of historical interpolation results 164 to generate and/or update the set of interpolation templates 168. That is, in 710 the interpolation engine 104 and/or other logic or service can scan or explore the set of historical interpolation results 164, applying the set of extraction rules 166 to that data, include sets of interpolated input data, to locate or identify interpolation results that demonstrate commonality, overlap, and/or other relationships between their constituent data and/or attributes. Those results in the set of historical interpolation results 164 that demonstrate such relationships can be grouped or analyzed together to generate an interpolation template reflecting common data attributes, trends, outcomes, and/or other results, for instance, encoding expected values or ranges for different variables found in some or all of those related interpolation results. For instance, the set of extraction rules 166 can indicate that results in the set of historical interpolation results 164 related to Corporation A shall be used to derive or shall be incorporated in a template in the set of interpolation templates 168 labeled "Corporation A Template," encoding common categories of income, expense, tax entries, and/or other variables, functions, and/or other data related to that entity, since data in the original records of the set of historical interpolation results 164 pertain to the same entity whose data can be expected to follow similar patterns or trends. In aspects, the template for that entity can be pre-filled with expected or anticipate values, and/or functions or percentages for different fields or values, such as to automatically generate a return on equity (ROI) of 15% because that field or variable has averaged that amount over the interval stored in the set of historical interpolation results 164. For further instance, the set of extraction rules 166 can indicate that results in the set of historical interpolation results 164 related to medical laboratory results shall be used to derive or shall be incorporated in a template in the set of interpolation templates 168 labeled "Clinical Template," or other identifier, and include automatically include fields or entries for various tests (e.g., electrocardiogram, electroencephalogram, blood tests, or others) that appear in some or all of medically-related results for one or more entities in the set of historical interpolation results 164. For further instance, the set of extraction rules 166 can indicate that any two data sets in the set of historical interpolation results 164 showing an overlap in variables, parameters, and/or other functions or attributes of at least 80% shall be deemed to be related or included for purposes of deriving a template for their constituent data, which can be labeled with an appropriate label related to that content. Other rules, heuristics, filters, and/or criteria can be encoded or applied in the set of extraction rules 166, for use in performing a discovery or analytic process on the set of historical interpolation results 164 to derived or extract data commonality in the set of interpolated input data and/or other data components of different studies, projects, databases, and/or files.

In 712, the user can access and/or receive the set of operative data 118 for the current interpolation study, analysis, and/or other activity using or via the interpolation engine 104 and/or other platform, and/or other logic, application, service, and/or interface. In aspects, the user can select the set of operative data 118 using selection dialog 112, and/or the set of operative data 118 can be automatically accessed or retrieved, for instance, via an application or service configured to automatically carry out interpolation operations. In 714, the interpolation engine 104 and/or other platform, and/or other logic, application, service, and/or interface can identify, select, and/or determine a data-selected template 170 from the set of interpolation templates 168 based on the set of operative data 118 accessed or selected for processing. In aspects, the data-selected template 170 can be or include a template, such as an XML (extensible markup language) document, spreadsheet, and/or database, which is pre-loaded or inserted with default values, variables, functions, filters, attributes, criteria, and/or other information, based on a match of the set of set of operative data 118 to the class, category, attributes, values, associated user or owner, and/or other characteristics of at least one template in the set of interpolation templates 168. Thus for instance, a template that is associated with the user accessing the set of operative data 118 and conducting the interpolation operations can be selected, keyed on for instance a user ID. In aspects, the selection of the data-selected template 170 can be made based on a match, overlap, and/or correlation between the content or characteristics of the set of operative data 118 and/or its attributes with the data-selected template 170 from within the set of interpolation templates 168. Thus for instance, a set of operative data 118 showing a direct or complete match in the name, identity, and/or dimensions or other attributes of individual variables in the set of predetermined input data 124 or other data reflected in an interpolation template in the set of interpolation templates 168 can be selected for user in processing the set of operative data. In cases, the interpolation engine 104 and/or other logic or service can apply a threshold or other filter or criteria to determine a match, such as to select a template in the set of interpolation templates 168 demonstrating at least an 80% match to the name, identity, and/or dimensions of individual variables in the set of predetermined input data 124 and/or other data in the subject set of operative data 118. Other filters, variables, tests, relationships, and/or other criteria can be used to determine or select a match of at least one template in the set of interpolation templates 168 to the current set of operative data 118 under study. In aspects, more than one template in the set of interpolation templates 168 can be selected or used.

In 716, the interpolation engine 104 and/or other logic or service can apply the data-selected template 170 to the set of operative data 118, including the set of predetermined input data 124 and/or other data, to generate the template-derived set of interpolated input data 172. That is, in aspects, the interpolation engine 104 and/or other logic or service can read out the settings, filters, parameters, functions, and/or other commands, instructions, and/or other pre-filled or configured data from the data-selected template 170 to apply that set of processing parameters to one or more pieces of constituent data in the set of operative data 118. Thus, for instance, in cases where the set of operative data 118 relates to climate modeling or analysis for the North American region, the data-selected template 170 can indicate or encode a set of settings of individual variables such as peak temperature equal to 115% of peak ocean temperature, adjusted down by 1% for each increment of average summer wind speed in miles per hour. In further cases where the set of operative data 118 relates to the quarterly financial report of XYZ Corp., the data-selected template 170 can indicate or encode a set of settings of individual variables such as setting net operating profit to 20% of gross quarterly revenue, adjusted by a percentage point down for every $500M of new capital investment but a 1.5% up for every $100M of increased sales in the European division of that corporation. Other levels, functions, adjustments, and/or other calculations or configuration settings can be used. The results of applying the data-selected template 170 to the set of operative data 118 again can be encoded in the template-derived set of interpolated input data 172, and for instance stored in the remote database 116 and/or other local or remote data store.

In 718, the interpolation engine 104 and/or other platform, logic, application, service, and/or interface can analyze the template-derived set of interpolated input data 172 and iterate interpolation processing on that data, and/or otherwise extend, refine, and/or otherwise process that data, as appropriate. For instance, a user may examine the template-derived set of interpolated input data 172 and determine that the set of interpolated input data 126 and/or other data or variables do not conform or approximate desired or expected values, and therefore the user may wish to continue to analyze or process the set of operative data 118, for instance using the template-derived set of interpolated input data 172 as a starting point for further operations. In cases, the user may find the results presented in the template-derived set of interpolated input data 172 to be acceptable in their original form, and conclude interpolation processing based on those results. In aspects, the ability to derive a set of estimated, default, and/or otherwise normalized results directly in the template-derived set of interpolated input data 172 can lead to greater computational or operational efficiency, since results that can be expected to correspond to accurate results or approximations can be generated without a necessity to repeat the inductive or other rounds of interpolation processing that would be needed to generate the same or similar results, using full interpolation computations.

In 720, the interpolation engine 104 and/or other logic or service can generate, store, encode, and/or otherwise record the resulting set of interpolated input data 126, whether directly from the template-derived set of interpolated input data 172 and/or further-processed data, along with other data as appropriate in the remote database 116, the local data store 106, and/or other local or remote database or data store. In 722, the interpolation engine 104 and/or other logic or service can update or revise the set of historical interpolation results 164, the set of interpolation templates 170, and/or other data, functions, configurations, and/or parameters, as appropriate. In 724, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Still further, while embodiments have been described in which a unitary weighting tool 154 is hosted in the interpolation engine 104 itself, in the weighting tool 154 can be hosted or installed in a different local or remote host machine, logic, and/or service. In embodiments, the weighting tool 154 can comprise a plurality of tools or logic distributed in or over one or more machines, platforms, or services. Other resources described as singular or integrated can in embodiments be plural or distributed, and resources described as multiple or distributed can in embodiments be combined. The scope of the invention is accordingly intended to be limited only by the following claims.

What is claimed:

1. A method comprising:
   accessing a set of historical interpolation results representing sets of interpolated input data derived from historical sets of operative data;
   applying, by a processor, a set of extraction rules to the set of historical interpolation results to generate a set of interpolation templates;
   selecting at least one of the set of interpolation templates corresponding to a current set of operative data comprising at least a set of predetermined input data and a set of target output data;
   applying the at least one of the set of interpolation templates to the current set of operative data to generate a template-derived set of interpolated input data; and
   initiating further interpolation operations based on the template-derived set of interpolated input data.

2. The method of claim 1, wherein the further interpolation operations comprise accepting the template-derived set of interpolated input data as conformally mapping the current set of operative data to the set of target output data.

3. The method of claim 1, wherein the further interpolation operations comprise performing interpolation operations on the template-derived set of interpolated input data to generate a produced set of interpolated input data conformal mapping of the current set of operative data to the set of target output data.

4. The method of claim 1, wherein the set of extraction rules comprises a set of data categories for the current set of operative data.

5. The method of claim 4, wherein the set of data categories comprises at least one of a technical data category, a financial data category, a medical data category, a climate data category, or an Internet data category.

6. The method of claim 4, wherein the set of extraction rules comprises a comparison of at least one attribute of the current set of operative data to at least one attribute of the set of interpolation templates.

7. The method of claim 6, wherein the at least one of the set of interpolation templates is selected based on a matching of the at least one attribute of the current set of operative data to the at least one attribute of recorded the set of interpolation templates.

8. The method of claim 7, wherein the matching comprises determining that a number of the at least one attribute of the current set of operative data matches at least a threshold number of the at least one attribute of the set of interpolation templates.

9. The method of claim 7, wherein the matching comprises determining that a dimension of the current set of operative data matches a dimension of the at least one of the set of interpolation templates.

10. The method of claim 7, wherein the matching comprises determining a match between a user identification associated with the current set of operative data and a user identification associated with the at least one of the set of interpolation templates.

11. The method of claim 7, wherein the at least one of the set of interpolation templates comprises an average of values for sets of interpolated input data in the set of historical interpolation results associated with attributes matched by the matching.

12. A system comprising:
an interface to a database to store a set of target output data and a set of predetermined input data; and
a processor, to communicate with the database via the interface, the processor to;
access a set of historical interpolation results representing sets of interpolated input data derived from historical sets of operative data,
apply a set of extraction rules to the set of historical interpolation results to generate a set of interpolation templates,
select at least one of the set of interpolation templates corresponding to a current set of operative data comprising at least a set of predetermined input data and a set of target output data,
apply the at least one of the set of interpolation templates to the current set of operative data to generate a template-derived set of interpolated input data, and
initiate further interpolation operations based on the template-derived set of interpolated input data.

13. The system of claim 12, wherein the further interpolation operations comprise accepting the template-derived set of interpolated input data as a set of interpolated input data conformally mapping the set of combined input data to the set of target output data.

14. The system of claim 12, wherein the further interpolation operations comprise performing interpolation operations on the template-derived set of interpolated input data as an initial data set to generate a set of interpolated input data producing a conformal mapping of the set of combined input data to the set of target output data.

15. The system of claim 12, wherein the set of extraction rules comprises a set of data categories for the current set of operative data.

16. The system of claim 15, wherein the set of data categories comprises at least one of a technical data category, a financial data category, a medical data category, a climate data category, or an Internet data category.

17. The system of claim 15, wherein the set of extraction rules comprises a comparison of at least one attribute of the current set of operative data to at least one attribute of the set of interpolation templates.

18. The system of claim 17, wherein the at least one of the set of interpolation templates is selected based on a matching of the at least one attribute of the current set of operative data to the at least one attribute of the set of interpolation templates.

19. The system of claim 18, wherein the matching comprises determining that a number of the at least one attribute of the current set of operative data matches at least a threshold number of the at least one attribute of the set of interpolation templates.

20. The system of claim 18, wherein the matching comprises determining that a dimension of the current set of operative data matches a dimension of the at least one of the set of interpolation templates.

21. The system of claim 18, wherein the matching comprises determining a match between a user identification associated with the current set of operative data and a user identification associated with the at least one of the set of interpolation templates.

22. The system of claim 18, wherein the at least one of the set of interpolation templates comprises an average of values for sets of interpolated input data in the set of historical interpolation results associated with one or more attributes matched by the matching.

* * * * *